United States Patent [19]

DuFrene

[11] Patent Number: 4,534,436
[45] Date of Patent: Aug. 13, 1985

[54] CONTROL VALVE APPARATUS AND STEERING SYSTEMS

[75] Inventor: Clement O. DuFrene, Cottage Grove, Minn.

[73] Assignee: Gordon Rosenmeier, Little Falls, Minn. ; a part interest

[21] Appl. No.: 526,340

[22] Filed: Aug. 25, 1983

[51] Int. Cl.³ .................. B62D 5/08; F15B 9/10
[52] U.S. Cl. .................. 180/144; 91/375 R; 137/625.21
[58] Field of Search .......... 180/144; 91/375; 137/625.21

[56] References Cited

U.S. PATENT DOCUMENTS

| | | | |
|---|---|---|---|
| 2,291,626 | 8/1942 | Huber | 180/144 X |
| 3,048,422 | 8/1962 | Payne et al. | 180/144 X |
| 3,332,509 | 7/1967 | Gondert | 180/144 X |
| 3,360,932 | 1/1968 | Lech et al. | 60/386 |
| 3,443,378 | 5/1969 | Monroe et al. | 60/384 |
| 3,495,674 | 2/1970 | Askins et al. | 180/140 |
| 3,564,848 | 2/1971 | Baatrup et al. | 60/384 |
| 4,010,816 | 3/1977 | Powell | 180/144 |
| 4,081,054 | 3/1978 | Yates | 180/139 |
| 4,232,708 | 11/1980 | Miller | 137/625.21 |
| 4,286,798 | 9/1981 | Butler et al. | 280/81.5 |
| 4,290,452 | 9/1981 | Takahashi et al. | 91/375 R X |
| 4,297,845 | 11/1981 | Kyster | 60/384 |
| 4,300,594 | 11/1981 | Bacardit | 91/375 R X |
| 4,320,780 | 3/1982 | Bacardit | 137/625.21 |
| 4,325,447 | 4/1982 | Dauvergne | 91/375 R X |

OTHER PUBLICATIONS

1965 Dodge Passenger Car Service Manual, Polara Custom 880 Monaco, Title page and pp. 19-7 through 19-9.
1978 Buick Chassis Servie Manual, title page and pp. 3B3-1 through 3B3-3.

Primary Examiner—Joseph F. Peters, Jr.
Assistant Examiner—Charles R. Watts
Attorney, Agent, or Firm—Robert C. Baker

[57] ABSTRACT

A fluid-system control valve apparatus having an adjustable valve assembly between base passages and action passages. The valve assembly comprises a pair of interfaced valve members individually rotatable and normally in neutral relationship. One is a driver and the other a follower. Rotation of the driver alters the neutral relationship and forms fluid passages through the valve assembly. A reactive damming cavity is fed by a metered portion of fluid passing through the valve assembly and effects subsequent follow up rotation by the follower, thus reforming the aforesaid neutral relationship. Steering systems for vehicles comprise the control valve apparatus, a turntable for wheels, a hydraulic cylinder for turning the turntable, and conduits between the valve apparatus and hydraulic cylinder.

20 Claims, 10 Drawing Figures

CONTROL VALVE APPARATUS AND STEERING SYSTEMS

BACKGROUND OF THE INVENTION

This invention relates to control valve apparatus for fluid systems, and more particularly to control valve apparatus that is exceedingly simple in structure but nevertheless functionally effective for steering vehicle wheels.

The invention also relates to steering systems and various combinations and subcombinations useful in steering systems for vehicles. The teachings are particularly useful for steering the wheels of trailers or other towed wheeled vehicles, although principles of the invention may also be applied in systems for steering the front or rear wheels of self-propelled vehicles including trucks, tractors, and the like.

Major benefits of the invention will particularly become evident as larger and larger trucks and trailers are placed in service and encounter difficulties in making turns within confined spatial areas and difficulties in backing for loading and The art of control valves is replete with complex apparatus having a multitude of elements necessary for the effective functioning thereof. Some power steering systems have required control valves equipped with gerotor or similar orbiting arrangements of complex and expensively machined character. Nothing is known which compares to the simplicity and effectiveness of the teachings of this invention.

SUMMARY OF THE INVENTION

The control valve apparatus of the present invention is designed for use as a controller in a variety of fluid systems, but most particularly in fluid steering systems. It comprises a housing having base passage means for source fluid and action passage means for work-performing fluid. An adjustable valve assembly is within the housing at a location between the base passage means and action passage means. The valve assembly comprises a pair of interfaced valve members individually rotatable about a common axis and normally in neutral relationship. One of the valve members is characterized as a driver member and the other as a follower member. A means is provided for effecting rotation of the driver member independently of the follower member to thereby alter the neutral relationship aforenoted and form fluid passage means through the valve assembly. A most significant feature is that of a reactive damming means, fed by a metered portion of fluid passing through the valve assembly, for effecting subsequent followup rotation by the follower member. The followup rotation by the follower member is effective to reform the neutral relationship between the valve assembly members after termination of the rotation effected for the driver member.

Systems for steering vehicle wheels comprise a fluid control valve, turnable mechanical means for mounting wheels thereon to provide steerability for the wheels, fluid-powered means for turning the mechanical means, and conduit means for conducting action fluid from the control valve to the aforenoted fluid-powered means for turning the mechanical means to effect steering. Preferably the turnable mechanical means comprises a turntable assembly. Further, where the turnable mechanical means is mounted on a trailer to provide steering capability for trailer wheels, the invention contemplates a means for locking the turnable mechanical means in a non-turnable condition for maintaining the wheels mounted thereon in a straight tracking alignment.

To inhibit or prevent theft of vehicles equipped with a steering system of the invention, a disabling means is provided comprising a disabling valve lockable in closed condition to block flow of fluid into fluid-powered means such as a hydraulic cylinder.

For a steering system in its entirety embodied as part of a trailer, the invention provides means for effecting rotation of the driver member of a control valve apparatus in a manner responsive to the turning movement of a vehicle towing the trailer and effectively causing a turn of trailer wheels in an opposite direction to the direction of turning movement of the towing vehicle.

A steering system of the invention may comprise not only a control valve apparatus mounted on a trailer and actuated responsively to the turning movement of a towing vehicle, but also a second control valve apparatus for effecting the steering or turning of the same trailer wheels manually, and means for electively disabling either or both of the control valve apparatuses.

Additional preferred features and combinations for steering systems according to the invention are described below.

BRIEF DESCRIPTION OF THE DRAWINGS

The specific embodiments of the invention illustrated in the drawings are to be recognized as illustrative and not limitative of the scope of the invention. In the drawings.

Figure 7:
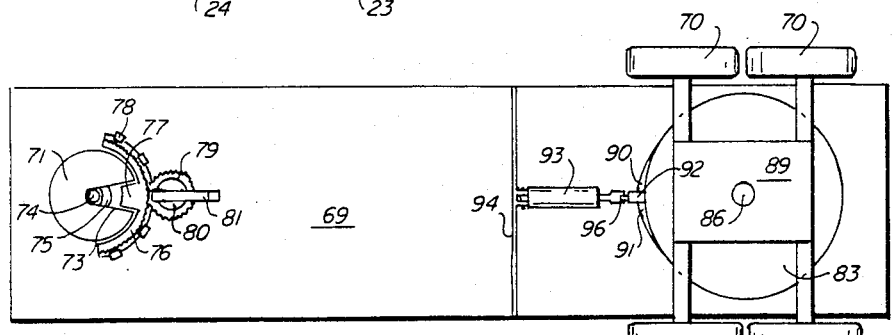
Figure 6:
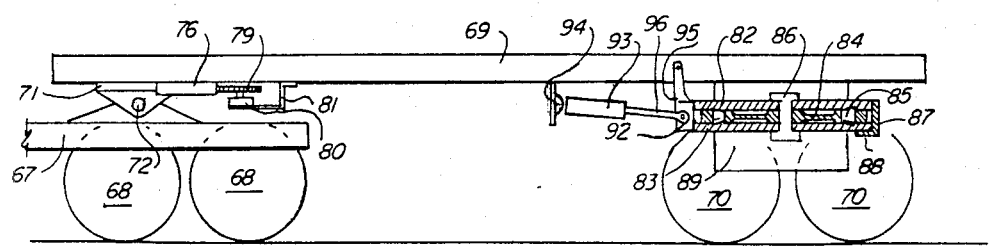
Figure 9:
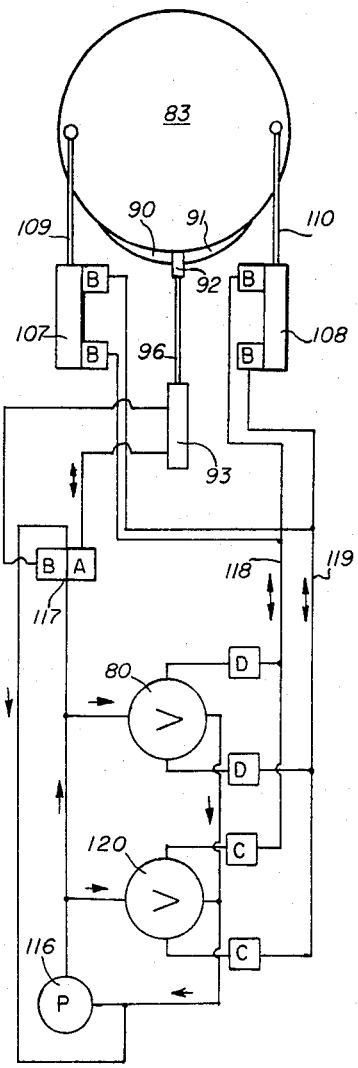
Figure 10:
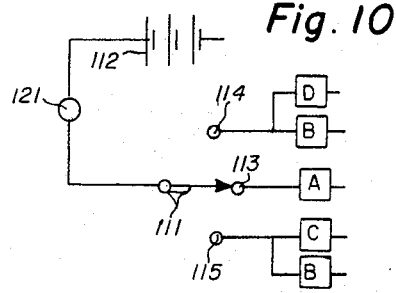
Figure 8:
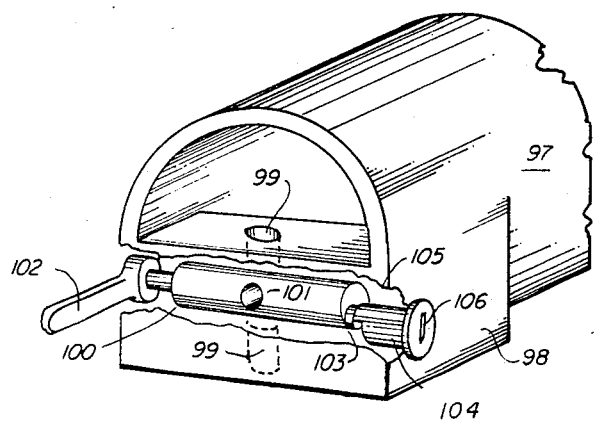

Solid lines outline elements of the follower valve member (the lower valve member) that are visible at the X interface; Short dash lines outline elements of the follower valve member located at the Y interface; Long dash lines with a dot between the dashes outline metering passages located between the interfaces X and Y for both the follower valve member and the driver (the upper) valve member; Long dash lines outline elements of the driver visible at the X interface; Dashes with two dots between each dash outline elements of the driver as visible at the Y interface; And lines composed of all dots (i.e., extremely tiny dashes) outline elements of the driver at the Z interface;

FIG. 6 is a schematic cross-section along a vertical plane longitudinally through a tractor-trailer assembly, with only basic features illustrating devices of the invention shown and parts broken away or many omitted for clarity of those shown;

FIG. 7 is a schematic view of the underside of the same tractor-trailer assembly illustrated in FIG. 6, with parts broken away;

FIG. 8 is a schematic perspective view of a disabling lock arrangement at the end of a hydraulic cylinder, with parts broken away or omitted for clarity of those shown;

FIG. 9 is a schematic representation of a steering system and the hydraulic circuit for it; and FIG. 10 is a schematic representation of a switch system for the showing in FIG. 9.

DESCRIPTION OF PREFERRED EMBODIMENTS

Control Valve Apparatus

Figure 1:
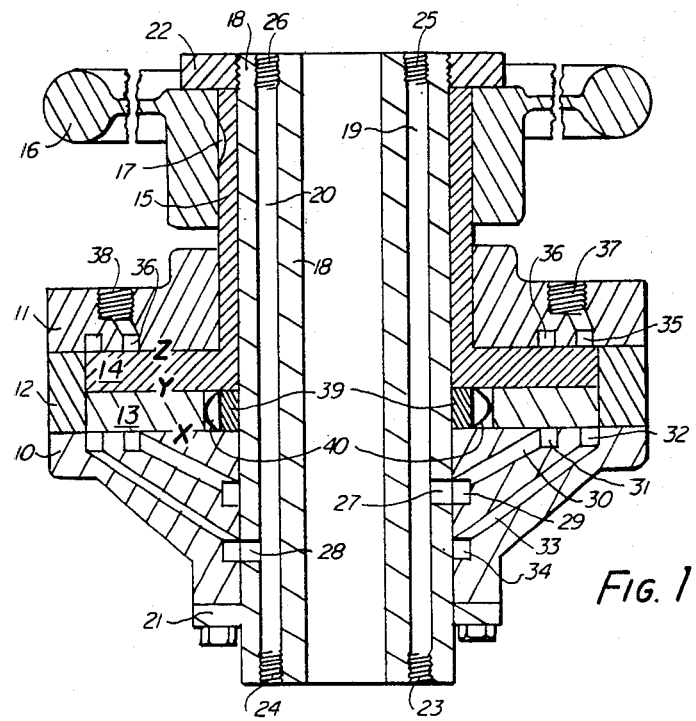
FIG. 1 is a schematic cross-sectional view along a plane common to the axis of a control valve apparatus according to the invention, with three interfaces of the structure labeled X, Y, and Z.

Referring to FIGS. 1 through 5 inclusive, and most particularly to FIG. 1, the control valve apparatus has a base housing 10, a cap or upper housing 11, and a retaining ring or peripheral housing 12. Within the housing is the adjustable valve assembly illustrated as consisting of two valve members, namely, a follower or driven valve member 13 and a driver valve member 14. A driver extension in the form of a sleeve 15 extends outwardly from the housing; and a steering handle or directional control means 16 is provided for rotating the driver 14. A key 17 locks the directional control means 16 to the driver sleeve 15.

Centrally within the structure is a sleeve 18; and the view of FIG. 1 shows two diametrically opposed longitudinal passages within the wall of sleeve 18. One such passage is the supply passage 19 for receiving fluid from an outside source such as a hydraulic pump. The other passage is a return passage 20 for returning fluid back to a reservoir associated with an outside source pump. An assembly flange 21 in the nature of an ear extends outwardly from the sleeve 18, and is conveniently used to bolt sleeve 18 to the lower housing 10. An assembly retaining ring 22 at the top end of sleeve 18 is suitably threaded on the sleeve 18 to place the elements of the valve apparatus in a snug relationship.

Any suitable conduit from a pressurized hydraulic fluid source may be threaded to the lower threaded port 23 of the supply passage 19; and the upper port 25 suitably plugged. The lower threaded port 24 is likewise provided with any suitable conduit for spent fluid exiting passage 20; and the upper return port 26 plugged. Details of hydraulic conduits, pumps, and reservoirs are ommited inasmuch as they are well known.

Incoming supply fluid in passage 19 moves through supply port 27 in the wall of sleeve 18; and return or spent fluid enters passage 20 through a return port 28 in the wall of sleeve 18.

The incoming supply fluid passes from port 27 into an annular receiving supply passage 29, then through a radial linking supply passage 30, into an annular valve facing supply groove or passage 31, which is open to the X interface between the base housing 10 and the follower valve member 13. Return or spent fluid exiting the follower valve member 13 passes into an annular return passage 32 which is in the nature of a groove in the upper surface of the base housing 10. From annular return passage 32, the fluid moves through a radial (much in the nature of a spider array) linking passage 33 into the annular return exit passage 34 and and then out port 28 and passage 20.

The cap or upper housing 11 carries two annular action-fluid passages 35 and 36, both in the nature of grooves into the valve-facing surface of the upper housing. These are for varied and selective communication with passages in the driver valve member 14. These annular passages 35 and 36 are shown in a coaxial relationship, with one communicating with an exit port 37 and the other with an exit port 38. Exit ports 37 and 38 are threaded for affixing hydraulic conduit means thereto. Fluid exiting or entering the ports 37 and 38 is looked upon as the action fluid; and those ports 37 and 38 and their communicating annular passages are looked upon as action passage means for passing fluid to and from a work-performing function.

A means also is provided for imparting some resistance to the movement of the follower or driven valve member 13; and this is illustrated in FIG. 1 as consisting of resistance blocks or brake blocks 39 pressed against the outer surface of the central sleeve 18 by means of a leaf spring 40.

Figure 2:
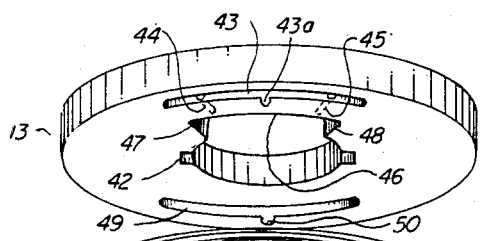
Figure 2:
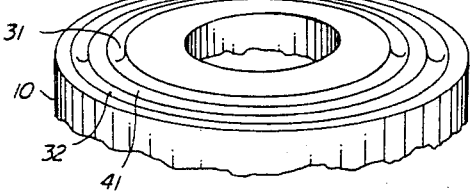

Referring to FIG. 2, the valve face surface of the base housing 10 (i.e., the X interface) should be recognized as having a land surface 41 between the annular grooved passages 31 and 32 therein. The follower or driven valve member 13 has diametrically opposed radial recesses 42 therein for accommodating resistance blocks 39 and springs 40. An arcuate inlet passage 43 extends entirely through the follower. The arcuate recess 43 itself rests in mating relationship over the land area 41 of the base housing; but this arcuate recess 43 is in constant communication with the supply passage 31 of the base housing through a grooved extension 43a extending radially inward (on the X interface follower surface) from the arcuate passage 43. Metering passages 44 and 45, for purposes to be hereafter explained, likewise extend from the arcuate inlet 43 (preferably through the wall thickness of follower 13) to a cavity which for purposes herein is characterized as a damming cavity, that is a cavity in which fluid under certain conditions may be dammed up to a degree. This damming of fluid causes a reactive result, and thus is characterized as a reactive damming cavity. The cavity which serves as part of a damming means is defined by side wall 46 having an arcuate contour and end walls 47 and 48. The innermost side wall of the cavity is effectively formed by the central sleeve member 18 (not shown in FIG. 2). An arcuate outlet passage 49 extends entirely through the follower 13. The X interface opening of passage 49 likewise rests upon the land area 41 of the base housing 10, but is in constant communication with the annular return passage 32 in the face of the base housing through a groove 50 into the surface of follower 13 facing the base housing.

Figure 3:
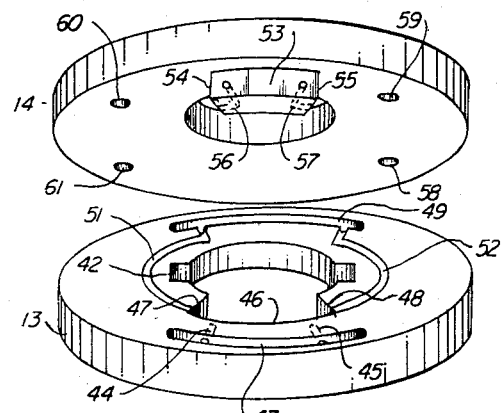

Referring to FIG. 3, follower 13 is equipped at its Y interface surface (that is, its surface facing the driver 14) with equalization passages 51 and 52, both in the nature of grooves into the upper or Y surface of follower 13. Groove 51 extends from the end wall 47 of the damming cavity to the arcuate outlet passage 49; and continuous passage extends from that outlet passage 49 through groove 52 to the other end 48 of the damming cavity. In essence, therefore, the grooves 51 and 52 permit shift of fluid in either direction therethrough for reasons which will be hereafter evident. Other elements shown for the follower in FIG. 3 are as discussed in connection with FIG. 2.

Continuing with the Y interface shown in FIG. 3, the driver 14 is equipped with a metering block or damming block 53 which projects into the damming cavity of walls 46, 47, and 48 without, however, fully occupying that cavity. The end walls 54 and 55 of the block 53 are not as far apart as the end walls 47 and 48 of the damming cavity. Since in the preferred embodiment, employing disc valve members, the side wall 46 of the damming cavity is arcuate, the metering or damming block 53 is likewise provided with a mating arcuate surface 53. Extending through the metering block as L-shaped passages are metering passages 56 and 57. These metering passages empty to opposite end walls of the block 53. Also shown in FIG. 3 and extending through the driver 14 are four action ports given numerals 58, 59, 60, and 61. In the preferred embodiment, none of these action passages is in communication with any passage of the follower 13 at the Y interface when the valve members 13 and 14 are in their normally neutral condition. In that normally neutral condition, in the preferred embodiment, no passages extend through the pair of valve members 13 and 14 for the flow of fluid therethrough.

Figure 4:
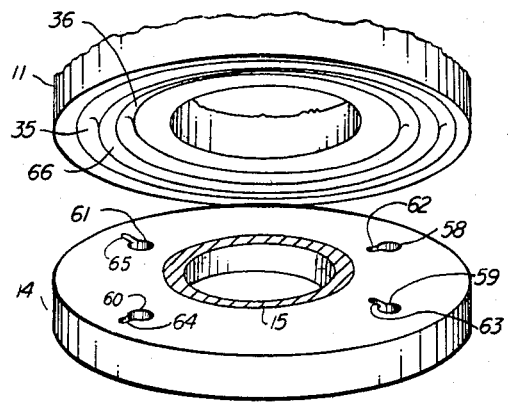
FIGS. 2, 3 and 4 are schematic perspective views of the structural features at the respective interfaces X, Y, and Z of FIG. 1, with each interface partially opened and viewed as one would view the internal characteristics of a partially opened clam shell—(as shown, features of the interfacial surfaces are imperfect in registration, but clarity for the registration relationships is supplied in the detailed description below)

Now referring to the Z interface shown in FIG. 4, attention is first called to the annular land area 66 between the annular grooved action passages 35 and 36 at the valve-mating surface of the cap or upper housing 11. While the action ports or passages 58, 59, 60, and 61 in the driver need not extend straight therethrough onto that land area 66, they are illustrated as so extending and the important point to recognize is that constant communication of the action ports 58 and 59 to upper housing annular groove 36 is provided by means of grooves 62 and 63 on the upper surface of driver 14 and extending radially inward. Further, the action ports 60 and 61 extending through driver 14 are provided at the upper surface of driver 14 with grooves 64 and 65 extending radially outward for constant communication with the annular action passage 35 of the cap or upper housing.

Figure 5:
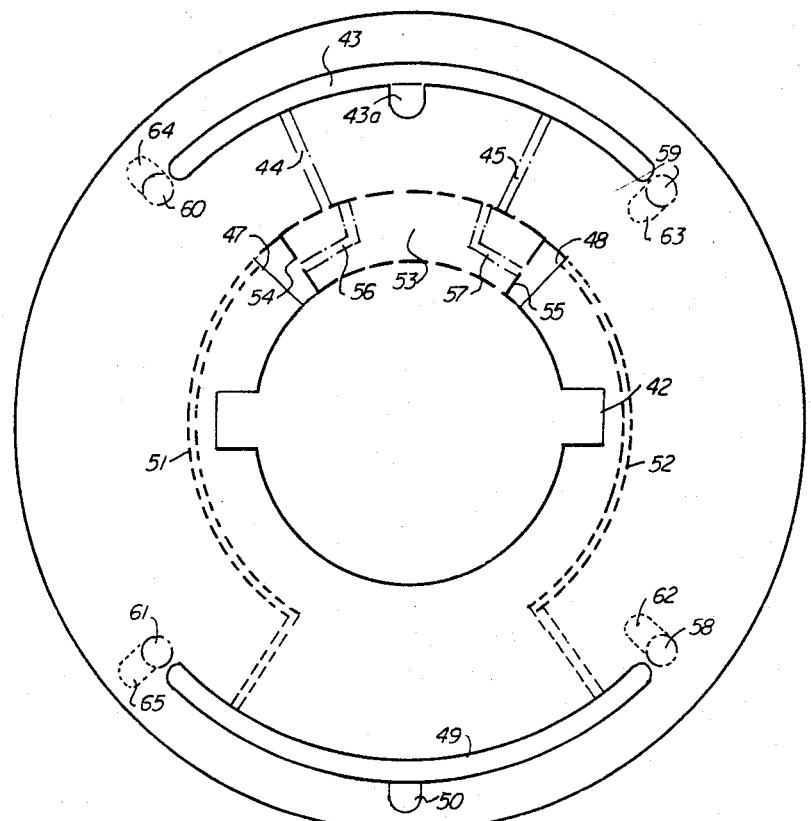
FIG. 5 is a schematic representation taken along the X interface of FIG. 1, looking upwardly from that interface, and illustrating only the passage or port relationships and features of the adjustable valve assembly members of the control valve apparatus, with the lines outlining those members coded as follows.

In FIG. 5, the relationship of the several passages and ports or communication channels in the two valve members 13 and 14 is illustrated in a superimposed relationship, with the numbering giving the various elements being identical to that given in discussing them in earlier Figures. Thus, when the valve elements are in what is characterized as a neutral condition, pressurized hydraulic fluid from a suitable source of supply is under pressure within the arcuate inlet cavity 43 of the follower as a result of entering that cavity by way of the groove 43a communicating with annular supply passage 31. But the fluid under pressure in the arcuate passage 43 remains there inasmuch as the passage 43 is oriented between action ports 59 and 60 of the driver; and the metering passages 44 and 45 are blocked at their outlet by the block 53 which is in spaced relationship from the end walls 47 and 48 of the damming cavity. Further, the arcuate outlet passage 49, while in constant communication with the annular outlet groove 32 in the upper face of the base housing through a grooved channel 50, is not in communication with either action port 61 or 62 of the driver. However, the driver may be rotated in either direction with respect to the follower member.

Continuing with FIG. 5, assume for the moment that the driver member is rotated in a clockwise direction as FIG. 5 is viewed. Under that set of circumstances, action port 60 of the driver 14 will be placed in communication with the supply inlet passage 43 of the follower 13 and permit flow of hydraulic fluid therethrough and out groove 64 and through action outlet 37 of the valve housing to a work-performing function. Further, action port 58 will be placed in communication with the arcuate return passage 49 of the follower, and permit fluid returning through the upper housing port 38 from a work-performing function to pass through action port 58 into arcuate return passage 49 and out the communicating groove 50 into the annular return passage 32 and ultimately back to a reservoir for recycling. Simultaneously, while the foregoing occurs, it will be noted that on turning the driver member in a clockwise direction as viewed in FIG. 5, metering block 53 which is fixed to the driver will be shifted clockwise so as to permit metering flow of fluid from the pressurized inlet arcuate passage 43 of the follower onward through metering passage 45 (of follower) and then through metering passage 57 (of metering block of driver) into the space area between the end wall 55 of the metering block 53 and end wall 48 of the damming cavity. While some of the fluid entering that space will bleed off through the equalization channel 52, a sufficient buildup of that fluid under the pressure conditions from the supply source will ultimately shortly cause the entire follower valve member to rotate in the same clockwise direction and to the same extent as that earlier made by the driver. The result will be that the buildup of fluid will force the valve elements back to their normally neutral condition illustrated in FIG. 5.

It should also be recognized that the initial clockwise rotary movement of the driver does cause fluid to go through equalization channels 51 and 52 to a limited extent, to accommodate a shift of fluid from the normally equal spaces between the ends 54 and 55 of the metering block 53 and the end walls 47 and 48 of the damming cavity within which the metering block 53 is shiftable. In other words, on a clockwise rotation, fluid passes out of the cavity between the walls 55 and 48 at the right in FIG. 5, through equalization passage 52, and enters equalization passage 51 to fill the expanding space between the walls 47 and 54 on the clockwise rotation of the metering block 53 (which occurs when the driver is rotated clockwise). Counterclockwise rotation of the driver effects a similar equalization through equalization passages 51 and 52. Also, on counterclockwise rotation, the space between the end walls 47 and 54 of the damming cavity receives fluid through the metering passages 44 and 56. Additionally, on counterclockwise rotation, the port 59 of the driver is placed in communication with the arcuate inlet 43 of the follower and allows flow of fluid through groove 63 into annular groove 36 and out action port 38 for a work-performing function in an opposite direction to that effected for clockwise rotation. Simultaneously, port 61 of the driver is placed in communication with the outlet arcuate passage 49 of the follower. Thus fluid returning from the work-performing function through port 37 of the cap housing passes through the passage 35 of that housing into driver groove 65 through port 61 and then through the outlet passage 49 of the follower and its grooved link 50 into the annular return passage 32 of the base housing. Again, it is the metering fluid passing through metering passages 44 and 56 into the damming cavity between the walls 47 and 54 that is dammed to cause a reactive force which moves the follower valve member in a counterclockwise direction so as to reform the neutral position for the relationship of the valve members 13 and 14, as illustrated in FIG. 5.

It will be appreciated that the resistance brake member 39 performs the function of holding the follower against movement when the driver is moved, but does not provide a sufficient resistance to movement of the driver to prevent hydraulic fluid from moving the driver. Further, it should be appreciated that the bulk of hydraulic fluid passes from the arcuate inlet 43 of the follower through either of the ports 59 or 60 of the driver on rotation of the driver. The metering ports 44 and 45 of the follower, as well as the metering ports or passages 56 and 57 of the driver metering block 53, are relatively small in diameter as compared to the ports 59 and 60 of the driver. Further, the equalization passages 51 and 52 are just sufficient in cross-sectional area to allow relatively easy rotational shift of the driver without extreme resistance of hydraulic fluid as it shifts through those equalization channels; they are generally smaller in cross section than the metering passages. Interestingly, resistance blocks 39 give way or allow rotation of the follower under the pressure of hydraulic fluid from the damming cavity with only modest effect on the steering handle 16, thus creating a sensitivity reaction on the steering handle 16 which is of modest character but desirable from the standpoint of steering sensitivity. In this connection, it will be noted that the metering passages and reactive damming means form in essence a separate network in the pair of valve members apart from the network of flow for the work-performing fluid from a pressurized source through the valve members.

Considerable variation from the exact physical structures and arrangements illustrated for the apparatus in FIGS. 1 through 5 may be made without departing from the essential scope and spirit of the invention. For example, driver ports 58, 59, 60, and 61 may be triangular in cross section with an apex of the triangle pointed toward the end of follower slot passages 43 and 49, which themselves may terminate in a triangular apex; such structural features enhance the regulation of minute flow at initial and terminal adjustment of the valve assembly members out of and into neutral relationships. The housing may be formed for conical valve members, or even for sleeve valve members, with sleeve shapes for the base and cap housing. Passages through the base housing 10 may be reduced in character to the point of resembling those through the illustrated cap housing 11. The location of structural and functional features on the pair of valve members may be reversed, the valve members may be reversed, and even the conduit connections reversed so as to connect source fluid at the illustrated action ports and action fluid at the illustrated source fluid passages. The illustration of the Figures omits O-ring seals; but such seals as well as other types of seals and even press-fitting may be employed between components in particular areas where other than modest leaks or no leaks of hydraulic fluid are desired, as will be readily appreciated by those skilled in the art.

Steering System and Devices

Referring particularly to FIGS. 6 and 7, an arrangement of elements for the purpose of automatically steering trailer wheels equipped with a turntable mechanical means for steering will be described.

Schematically illustrated (FIG. 6) is a portion of a tractor (towing vehicle) platform 67 supported by rear tractor wheels 68 and a semi-trailer bed 69 supported by rear wheels 70. Fixed on the tractor member 67 is a swivel disc 71 pivotable on a lateral axis 72 so as to constantly maintain the upper surface of the swivel disc 71 in the same plane as the trailer bed 69 when the tractor hauls the trailer up and down hills. Turning to FIG. 7, the swivel disc 71 is equipped with a slot 73 extending inward from its periphery; and as the tractor backs toward a parked trailer with the swivel disc underneath the bed 69 of the trailer, a pin in the nature of a post 74 fixed on the lower surface of the trailer bed 69 passes through the slot 73 and then is locked on post 73 by a mechanism 75 on the tractor. The post 74 of the trailer bed is thus locked at the center axis of the towing disc mount 71 of the tractor.

Illustrated schematically in FIGS. 6 and 7 is an arced gear 76, with teeth on its outer periphery and a locking lug 77 extending radially inward from a medial location at its inner periphery. This arced gear 76 with its locking lug 77 is mounted for arced movement on the underside of the trailer bed 69. Retaining brackets 78 of any suitable character are employed to hold this arced gear 77 at the underside of the trailer bed 69. Illustratively, retaining brackets 78 suitably are fixed on the underside of the trailer bed 69 and extend downwardly as L-shaped members underneath a retaining ring at the upper surface of the arced gear 76. Any suitable retaining bracket members and cooperative tracking on an arced gear may be employed to hold the arced gear 76 on the underside of the trailer bed so as to permit the arced gear 76 to move arcuately. The arcuate movement is effected as a result of the rotation of disc 71 (relative to trailer 69) whenever the tractor turns a corner towing the trailer bed 69. The rotational shifts of the disc 71 effectively are transmitted to the arced gear through the lug 77 within the slot 73 of the disc 71.

Also mounted on the underside of the trailer bed is a toothed gear 79 and suitably having teeth about its entire periphery. To the axial shaft of toothed gear 79 is mounted a valve 80, specifically a control valve apparatus as hereinabove described. And more specifically, the axial shaft of gear 79 is fixed to the driver extension 15 of the valve apparatus so as to effect rotation of that driver extension with rotational movement in either direction by gear 79. The valve apparatus 80 is fixed to the underside of the trailer bed 69 by means of any suitable bracket 81.

All hydraulic lines as well as the steering hydraulic mechanisms are omitted from FIGS. 6 and 7 in order to permit greater clarity of showing of the features schematically illustrated in those Figures; for the showing of hydraulic lines and the steering hydraulic means or cylinders, see FIG. 10. At this point it is sufficient to recognize that change of direction of the towing vehicle, as by turning a corner, will effectively cause rotation of gear 79 and therefore the driver of the valve 80.

Referring now particularly to the portion of FIGS. 6 and 7 at the right-hand side of each, the elements making up a turntable assembly and means for locking the trailer wheels 70 against turnability or for straight tracking will be described. Steering turnability of the trailer wheels 70 is provided by a turntable assembly comprising a rigid upper turntable plate 82, a lower turntable 83, and an intermediate roller bearing holder or retainer 84 carrying tapered roller bearings 85 between the upper turntable plate 82 and lower turntable plate 83. An axis pin 86 extends through the upper turntable 82, roller bearing holder 84 (e.g., a spider wheel) and lower turntable 83. About the rear portion of the turntable assembly is a retainer band 87, which also serves somewhat as a dust shield, and supports lower inwardly extending flange retainer plates 88. Flange plates 88 are suitably spaced in a circumferential arrangement and are omitted from the lead or front portion of the turntable assembly where the lower turntable 83 must be exposed for reasons which will hereinafter be evident. Any suitable means are employed as an anchoring or mounting means 89 for fixing the tandem rear wheels 70 as a unit to the lower turntable 83 for turning the entire tandem wheel assembly about the vertical axis 86. Similarly, any suitable means may be employed to mount the upper turntable plate 82 fixedly against movement to the underside of the trailer bed 69.

Referring now particularly to FIG. 7, each turntable plate 82 and 83 is equipped, at the front or lead edges thereof, with an outwardly projecting pair of locking cam surfaces 90 and 91. When the pair of locking cam members 90 and 91 on the lower turntable 83 are oriented directly below the pair of locking cam surfaces of identical character on the upper member 82 of the turntable assembly, a cam locking lug 92 operated by a hydraulic cylinder 93 may be rammed into the space between the respective cam locking lugs 90 and 91 of the lower turntable 83 as well as between those cam locking lugs on the upper member 82 of the turntable so as to fixedly maintain the tandem wheels 70 in straight tracking alignment for highway travel. The cam locking lug 92 is operated by a hydraulic cylinder 93 mounted at its inactive end on any suitable member 94. The ram 96 of the hydraulic cylinder is suitably carried by a swivel mounting 95 for the cam locking lug 92. Retraction of the ram 96, of course, withdraws the lug 92 and allows steering shift of the lower turntable 83.

Before turning to the schematic showing of hydraulic connections and the controls illustrated in FIGS. 9 and 10, reference is made to FIG. 8 for the purpose of describing a means for locking a fluid-powered means or work-performing hydraulic member (such as a hydraulic cylinder) into a disabled condition, that is, a condition which can be highly discouraging to theft of trailers or tractors equipped with the same. At one end of a hydraulic cylinder 97 an extension housing 98 may be mounted or made substantially integral with the body of the hydraulic cylinder 97. The action fluid passage 99 leading into that end of the hydraulic cylinder may have interposed in its line of feed a lockable rotatable valve member 100, with a port 101 therethrough. A handle 102 may be employed to rotate the valve 100 about 90 degrees from the position illustrated so as to permit flow of hydraulic fluid entirely through the valve 100 and passage 99, or to place the valve 100 in the position illustrated in FIG. 8. The cylinder of the rotatable valve 100 is provided at one end with a crescent cutout 103 extending radially inward into its body. A lock cylinder 104, equipped at its end with a mating crescent lock member 105, may be rotated as by a key through a key slot 106 so as to occupy the crescent cutout 103 and hold the valve cylinder 100 in the position illustrated in FIG. 8, thereby blocking entrance or exit of fluid through the passage 99 and effectively disabling operation of the hydraulic cylinder. Steerable wheels equipped with such a hydraulic cylinder disabling system may be placed in a turned condition and the hydraulic cylinder disabled as illustrated, with the result that theft of the vehicle so equipped is highly discouraged.

Referring now to FIG. 9, some elements in that Figure that are common to elements earlier described with reference to FIGS. 6 and 7 are: the control valve apparatus 80 (operated by the toothed gear 79); the lower turntable 83; cams 90 and 91 on the lower turntable 83; and the cam locking lug 92 operated by hydraulic cylinder 93 through its ram 96.

Continuing with FIG. 9, two fluid-powered means for turning the turntable mechanical means 83 are provided and are hydraulic cylinders 107 and 108 (suitably mounted underneath a trailer bed such as trailer bed 69 of FIG. 6). These hydraulic cylinders have their ram members 109 and 110 oriented in parallel and fixed by pivot mounting to diametrically opposite sides of the lower turntable 83. A hydraulic pump 116 is illustrated for pumping fluid out hydraulic conduit lines in the direction illustrated by arrows, with return fluid to the pump suitably passing to a reservoir (not shown) for recycling. A bi-directional or double acting solenoid-operated valve 117 is interposed in the pump line feeding the hydraulic cylinder 93 which operates the cam locking lug 92 for holding the lower turntable 83 against turning movement. Hydraulic lines 118 and 119 from the gear-operated control valve apparatus 80 and from a manual-operated control valve apparatus of the invention are given numeral 120. They feed work-performing hydraulic fluid from the control valves 80 and 120 to the hydraulic cylinders 107 and 108 for the purpose of effecting rotation of the lower turntable 83 in either direction and therefore effecting steering of the wheels carried by that lower turntable.

Completing discussion of FIG. 9 requires reference to FIG. 10, illustrating electrical components, specifically a switch 111 connected to a positive battery source 112 and shiftable between switch contacts 113, 114, and 115. A master switch schematically illustrated at 121 is for the purpose of totally terminating any flow of current as when in a parking condition. When switch 111 is in the position illustrated in FIG. 10, for flow of current through contact 113, the only effect is that of actuating a solenoid valve labeled A in FIG. 9. The only solenoid valve labeled A in FIG. 9 is that comprising a part of the bi-directional solenoid valve 117. When that portion of solenoid valve A is actuated, hydraulic fluid from pump 116 is directed through valve 117 so as to go out the hydraulic conduit line connected to the back or left end of hydraulic cylinder 93, so as to force the piston within that hydraulic cylinder to the right and consequently extend ram 96 and cam locking lug 92 to the right, with the result of locking the lower turntable 83 against movement and placing it in a position for tracking of the wheels carried by it.

Where manual steering of the wheels carried by the lower turntable 83 is desired, the switch 111 is shifted to contact 115 in FIG. 10, thereby actuating the solenoid valves labeled B and C in FIG. 9. Specifically, valve 117 is thus shifted so as to effect flow of hydraulic fluid from the pump 116 through the bi-directional solenoid control valve 117 and out the line of that bi-directional valve which empties into the front or right end of hydraulic cylinder 93, thereby forcing the piston in that cylinder backwards and pulling lug 92 away from its locking condition between cam members 90 and 91 on the lower turntable 83 so as to permit turning movement of the lower turntable 83. Further, solenoid control valves B in each line at hydraulic cylinders 107 and 108 are opened, thereby permitting those hydraulic cylinders to function to turn lower turntable 83, and consequently steer the tandem wheels carried by that turntable member. Additionally, solenoid control valve C in the work-performing hydraulic lines from the control valve apparatus 120 is opened, with the result that the entire hydraulic system controlled by the steering valve 120 of the invention is placed in operation, with the automatically controlled valve 80 in a disabled condition. Thus, manual control of the steering of the wheels carried by the turntable 83 is conveniently accomplished as from the cab of a tractor.

Where automatic steering by steering valve 80 is desired, especially in traversing narrow streets or the like, switch 111 of FIG. 10 is shifted to the switch contact 114 to actuate the solenoid controlled valves B and D in FIG. 9. The only difference effected by that position for the switch, as compared to the position 115 for the switch, is to disable or close solenoid valves C and effect the opening of the solenoid control valves D. This arrangement permits the automatically turned control valve apparatus 80 to control the flow of hydraulic fluid to the turntable-actuating hydraulic cylinders 107 and 108.

The center of the central sleeve 18 of the control valve apparatus advantageously permits mounting of that apparatus at a location about an existing steering column of a self-propelled vehicle for the purpose of steering front wheels or rear wheels of the self-propelled vehicle, or for steering trailer wheels.

Specific hydraulic conduit connection between action ports of control valve apparatus and hydraulic fluid-powered means to effect turning steering movement may be adjusted so that the desired response of movement by steerable wheels is accomplished, as will be evident to those skilled in the art.

It will be appreciated that the invention may be embodied in other forms and variations without departing from the essential spirit and attributes thereof. In this respect, equivalents of specific features now or hereafter known are comprehended by the claims, which are to be construed as broadly as consistent with their validity.

That which is claimed is:

1. A control valve apparatus for fluid systems, comprising a housing having base passage means for source fluid opening at a first valve-facing surface within said housing and action passage means for work-performing fluid opening at a second valve-facing surface within said housing, said first and second valve-facing surfaces being in opposing spaced apart relationship, an adjustable valve assembly within said housing at a location between said first and second valve-facing surfaces, said valve assembly comprising a pair of interfaced valve members individually rotatable about a common axis and normally in a neutral relationship in which no through passages are formed between said base passage means and said action passage means, one said valve member being a driver member and the other a follower member, means for effecting rotation of said driver member independently of said follower member to thereby alter said neutral relationship and form fluid passage means through said valve assembly for fluid passage between said base passage means and said action passage means, and reactive damming means within said valve assembly and including metering passage means therefor distinct from said fluid passage means of said valve assembly, said reactive damming means being fed through said metering passage means by a metered portion of the fluid that passes through said fluid passage means of said valve assembly to thereby effect subsequent followup rotation by said follower member and reform said neutral relationship after termination of said driver member rotation.

2. The control valve apparatus of claim 1 wherein said reactive damming means comprises a cavity in a valve member of said valve assembly.

3. The control valve apparatus of claim 1 wherein said reactive damming means comprises a cavity in either of said valve members and a block extending from the other said valve member into said cavity, said cavity being larger than said block.

4. The control valve apparatus of claim 3 wherein said cavity is in said follower member and said block is on said driver member, and wherein said block includes metering passages of said metering passage means.

5. The control valve apparatus of claim 1 wherein said follower member is proximate to said base passage means and said driver member is proximate to said action passage means.

6. The control valve apparatus of claim 1 wherein said interfaced valve members comprise disc-like members.

7. In a system for steering wheels of a vehicle, the combination including the control valve apparatus of claim 1, turnable mechanical means for supporting wheels thereon in a steerable manner, fluid-powered means for turning said mechanical means, and conduit means for conducting fluid from said action passage means of said control valve apparatus to said fluid-powered means.

8. The system of claim 7 wherein said turnable mechanical means comprises a turntable assembly, said system additionally comprising means for locking said turnable mechanical means in a non-turnable condition for maintaining the wheels supported thereby in straight tracking alignment.

9. The system of claim 7 additionally comprising disabling means for rendering said fluid-powered means inoperable, said disabling means comprising a disabling valve lockable in closed position to block flow of fluid to said fluid-powered means.

10. The system of claim 7 embodied in its entirety as part of a trailer, with said control valve apparatus mounted on said trailer, and wherein said means for effecting rotation of said driver member of said control valve apparatus comprises means actuated responsively to the turning movement of a vehicle towing said trailer and effectively causing a turn of trailer wheels in an opposite direction to the direction of turning movement of said towing vehicle.

11. The system of claim 7 embodied in its entirety as part of a trailer, with a said control valve apparatus mounted on said trailer, and wherein said means for effecting rotation of said driver member of said control valve apparatus comprises means actuated responsively to the turning movement of a vehicle towing said trailer and effectively causing a turn of trailer wheels in an opposite direction to the direction of turning movement of said towing vehicle, and additionally comprising a second said control valve apparatus and means for electively disabling either or both of said control valve apparatuses.

12. In a steering system for steerable wheels of a vehicle, the combination including the control valve apparatus of claim 1, mechanical means for moving the steerable wheels, fluid-powered means for moving said mechanical means, and means for conduiting fluid from said action passage means of said control valve apparatus to said fluid-powered means.

13. The control valve apparatus of claim 1 wherein said reactive damming means comprises an arcuate cavity in either of said valve members and an arcuate block of lesser arcuate length than said cavity extending from the other said valve member into said cavity.

14. The control valve apparatus of claim 13 wherein said valve assembly additionally includes equalization passage means extending as a continuous passage of communication between opposite ends of said arcuate cavity.

15. The control valve apparatus of claim 3 wherein said valve assembly additionally includes equalization passage means extending as a continuous passage of communication between opposite ends of said cavity.

16. The control valve apparatus of claim 1 wherein said reactive damming means additionally includes equalization passage means for fluid within the assembly of elements comprising said reaction damming means to shift in location during rotation of said driver member.

17. The control valve apparatus of claim 1 wherein said reactive damming means additionally includes equalization passage means for fluid within the assembly of elements comprising said reaction damming means to shift in location during rotation of said follower member.

18. A control valve apparatus for fluid systems, comprising a housing having base passage means for source fluid opening at a first valve-facing surface within said housing and action passage means for work-performing fluid opening at a second valve-facing surface within said housing, said first and second valve-facing surfaces being in opposing spaced apart relationship, an adjustable valve assembly within said housing at a location between said first and second valve-facing surfaces, said valve assembly consisting of a pair of interfaced valve members individually rotatable about a common axis and normally in a neutral relationship in which no through passages are formed between said base passage means and said action passage means, one said valve member being a driver member and the other a follower member, means for effecting rotation of said driver member independently of said follower member to thereby alter said neutral relationship and form fluid passage means through said valve assembly for fluid passage between said base passage means and said action passage means, and reactive damming means within said valve assembly, said reactive damming means comprising an arcuate cavity in either of said valve members and an arcuate block of lesser arcuate length than said cavity extending from the other said valve member into said cavity, said reactive damming means also including metering passage means therefor and equalization passage means therefor, said metering passage means being distinct from said fluid passage means of said valve assembly, said reactive damming means being fed through said metering passage means by a metered portion of the fluid that passes through said fluid passage means of said valve assembly to thereby effect subsequent followup rotation by said follower member and reform said neutral relationship after termination of said driver member rotation, said equalization passage means comprising a continuous passage of communication between opposite ends of said arcuate cavity.

19. The control valve apparatus of claim 18 wherein said interfaced valve members comprise disk-like members.

20. In a steering system for steerable wheels of a vehicle, the combination including the control valve apparatus of claim 18, mechanical means for moving the steerable wheels, fluid-powered means for moving said mechanical means, and means for conduiting fluid from said action passage means of said control valve apparatus to said fluid-powered means.

* * * * *

UNITED STATES PATENT AND TRADEMARK OFFICE
CERTIFICATE OF CORRECTION

PATENT NO. : 4,534,436

DATED : August 13, 1985

INVENTOR(S) : Clement O. DuFrene

It is certified that error appears in the above—identified patent and that said Letters Patent is hereby corrected as shown below:

Col. 1, line 23 should read: "backing for loading and unloading."

Col. 3, line 51 - delete "ommitted" and insert --omitted--.

Signed and Sealed this

Twenty-second Day of October 1985

[SEAL]

Attest:

Attesting Officer

DONALD J. QUIGG

Commissioner of Patents and Trademarks—Designate